(12) United States Patent
Carter et al.

(10) Patent No.: US 6,791,852 B2
(45) Date of Patent: Sep. 14, 2004

(54) METHOD FOR DETECTING AND IDENTIFYING SHORTED THYRISTORS

(75) Inventors: Richard W. Carter, Roanoke, VA (US); Rick L. Gintz, Roanoke, VA (US); Allen M. Ritter, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/683,437

(22) Filed: Dec. 28, 2001

(65) Prior Publication Data

US 2003/0123267 A1 Jul. 3, 2003

(51) Int. Cl.⁷ .............................. H02H 7/00; H02H 3/00
(52) U.S. Cl. .......................... 363/57; 363/51; 361/100; 361/93.1
(58) Field of Search ............................. 363/57, 54, 55, 363/56, 60, 61, 49, 51; 361/93.1, 87, 79, 100, 117; 318/798, 806

(56) References Cited

U.S. PATENT DOCUMENTS

| | | | |
|---|---|---|---|
| 4,150,411 A | 4/1979 | Howell | |
| 4,346,421 A | 8/1982 | Gurr | |
| 4,475,150 A | * 10/1984 | D'Atre et al. | ................. 363/51 |
| 4,486,801 A | 12/1984 | Jackovich et al. | |
| 4,595,965 A | 6/1986 | Glennon | |
| 4,633,241 A | * 12/1986 | Casteel et al. | .............. 340/645 |
| 4,884,025 A | 11/1989 | Häusler | |
| 4,942,494 A | * 7/1990 | Fabianowski et al. | ........ 361/93 |
| 5,047,890 A | 9/1991 | Kessler | |
| 5,266,891 A | 11/1993 | Kumar et al. | |
| 5,523,938 A | 6/1996 | Wagner et al. | |
| 6,211,792 B1 | * 4/2001 | Jadric et al. | ................. 340/635 |
| 6,291,987 B1 | 9/2001 | Dean et al. | |
| 6,404,346 B1 | * 6/2002 | Jadric et al. | ................. 340/635 |

* cited by examiner

*Primary Examiner*—Rajnikant B. Patel
(74) *Attorney, Agent, or Firm*—Karl Vick; Kevin Duncan; Hunton & Williams LLP (57) ABSTRACT

A method is provided for determining a shorted thyristor cell in a bridge that supplies a load from a source, the bridge including a plurality of the thyristor cells. The method includes the step of sequentially gating each of the cells to a conducting state, so that only one cell is gated at one time; providing at least one current transformer in the bridge; generating a current flow that passes through the bridge including the one cell that is gated; observing current in the at least one current transformer to determine a short in one of the cells the that is not gated; and determining a shorted cell based on the step of observing current in the at least one current transformer.

22 Claims, 6 Drawing Sheets

METHOD FOR DETECTING AND IDENTIFYING SHORTED THYRISTORS

BACKGROUND OF THE INVENTION

The invention relates to a cell test for detecting and identifying a shorted thyristor, such as a silicon controlled rectifier, using current transformers.

One of the known cell test methods for detecting shorted thyristors, such as silicon controlled rectifiers (SCR), is by gating each cell individually and monitoring the resulting shunt current or voltage level across an external motor circuit. If the current or voltage level of the voltage is above a threshold value, then a failed cell is identified. A look-up table may be used to assist in the identification of the shorted cell based on which cell is gated.

However, there are various shortcomings to this technique. For example, when testing for a short using a shunt, variances in the motor circuit inductance and resistance will influence the shunt current level. As a result, too low a current signal level will result in a short not being detected, thus allowing the test to continue. Fuse failure can then result when paired cells are fired during the following open circuit test. Further, detection by voltage is sensitive to extraneous voltage spikes, i.e., ringing due to snubbers, and can result in a false detection occurring. The method of the invention addresses these and other problems with the known cell test techniques.

SUMMARY OF THE INVENTION

In accordance with one aspect of the invention, a method is provided for determining a shorted thyristor cell in a bridge that supplies a load from a source, the bridge including a plurality of the thyristor cells. The method includes the step of sequentially gating each of the cells to a conducting state, so that only one cell is gated at one time; providing at least one current transformer in the bridge; generating a current flow that passes through the bridge including the one cell that is gated; observing current in the at least one current transformer to determine a short in one of the cells the that is not gated; and determining a shorted cell based on the step of observing current in the at least one current transformer.

In accordance with a further aspect of the invention, a method is provided for determining a shorted thyristor cell in a bridge that supplies a load from a source, the bridge including a plurality of the thyristor cells, the method including the steps of sequentially gating each of the cells to a conducting state, so that only one cell is gated at one time; providing at least one current transformer in the bridge, the at least one current transformer being placed on incoming lines to the bridge, the bridge supplying the load to a motor; generating a current flow that passes through the bridge including the one cell that is gated, and wherein the bridge further includes a shunt, the shunt having a shunt current signal value, and wherein the current flow that is generated is below the shunt current signal value; observing current in the at least one current transformer to determine a short in one of the cells the that is not gated; and determining a shorted cell based on the step of observing current in the at least one current transformer.

BRIEF DESCRIPTION OF THE DRAWINGS

The present invention can be more fully understood by reading the following detailed description together with the accompanying drawings, in which like reference indicators are used to designate like elements, and in which.

DETAILED DESCRIPTION OF THE INVENTION

Hereinafter, aspects of detecting thyristors, such as shorted silicon controlled rectifiers, in accordance with various embodiments of the invention will be described. As used herein, any term in the singular may be interpreted to be in the plural, and alternatively, any term in the plural may be interpreted to be in the singular.

The method of detecting shorted silicon controlled rectifiers using current transformers of the invention is directed to the above stated problems, as well as other problems, that are present in conventional techniques.

The foregoing description of various products, methods, and apparatus and their attendant disadvantages is in no way intended to limit the scope of the present invention, or to imply that the present invention does not include some or all of the various elements of the products, methods, and apparatus in one form or another. Indeed, various embodiments of the invention may be capable of overcoming some of the disadvantages noted herein, while still retaining some or all of the various elements of the products, methods, and apparatus in one form or another.

The method of the invention provides a robust technique for determining a shorted "cell" by limiting the current detection path to that which occurs within the bridge of the circuit in accordance with some embodiments. As used herein, the term "cell" means a thyristor and/or a thyristor cell. Illustratively, such a thyristor may be a silicon controlled rectifier (SCR). However, it should be appreciated that the system and method of the invention are not limited to SCRs.

Further, the method of the invention utilizes the placement of current transformers on incoming lines to a bridge. The observed signal from the current transformers is rectified and scaled so that the signal level of the signal monitored is equivalent to that of the "shunt current signal value," i.e., the current signal level necessary for current to pass through the shunt under non-shorted conditions.

The current transformers may detect current both within the bridge and also within the external motor circuit. In order to limit the detection to only the bridge path, the current through the shunt is also monitored. Current transformer detection occurs when the current transformer current is above the current transformer threshold level and the shunt current is below the shunt threshold level. A specific look-up table is utilized to identify the shorted cell by using the current transformers. It should be appreciated that the technique of the invention assumes that the phase rotation of the circuit is correct, and further, that the cells are wired correctly.

It should also be appreciated that the method of the invention utilizing current transformers may also be utilized in conjunction with other known techniques for detecting shorted cells. That is, in order to provide redundancy, detection by the current transformer feedback method of the invention may be utilized in conjunction with shunt feedback, i.e., such that the failure of one type of test will still result in the shorted cell being detected and identified. In accordance with one embodiment of the method of the invention, if the current within the shunt is above the threshold level, the current transformer current detection is ignored and the look-up table for the shunt is used. However, if the current transformer current threshold level is reached and the shunt current is below the threshold level, the look-up table for the current transformer is used. Thus, by using both methods, shorted cells can be detected sooner than if either method was used alone.

For example in Table 1, discussed below, shorted cell 6F will be identified by the CT detection when CT_Data_Ptr has reached step 2—but the cell test will have to continue firing until step 5 to be detected by shunt detection, thus completely missing the case where the bridge is experiencing higher short circuit current. This is beneficial in that fewer firings of the bridge occur under certain shorted conditions. Such quick detection may alleviate a variety of problems including stresses on fuses, for example. Further, the redundancy utilized in conjunction with the invention also allows the more noise-sensitive voltage detection to be ignored.

However, it should be appreciate that the technique of the invention utilizing current transformers may be used alone without the redundancy described above. For example, during a cell test should, for some reason, the shunt feedback be inoperative, the current transformer detection may still in most situations correctly identify the failed cell. This may be performed by setting the current transformer threshold level to a multiple of the shunt threshold level, when the motor inductance is much greater than the transformer inductance.

In table 1, discussed below, with CT_Data_Ptr at 1, 2, or 3, detection by current transformers will identify shorted cells 1F, 6F, and 2F (Column 3) and the test will be stopped and repeated before current flows in the external motor circuit. For cells 4F, 3F, 5F (Column 3), with only CT detection, current will flow first through the external motor circuit and will be sensed by the CTS, but not identified as a shorted cell, as the level of current will be below the CT threshold. The cells will be identified as shorted later when CTData_Ptr is at 4, 5, or 6 and short circuit current is flowing.

Figure 1:
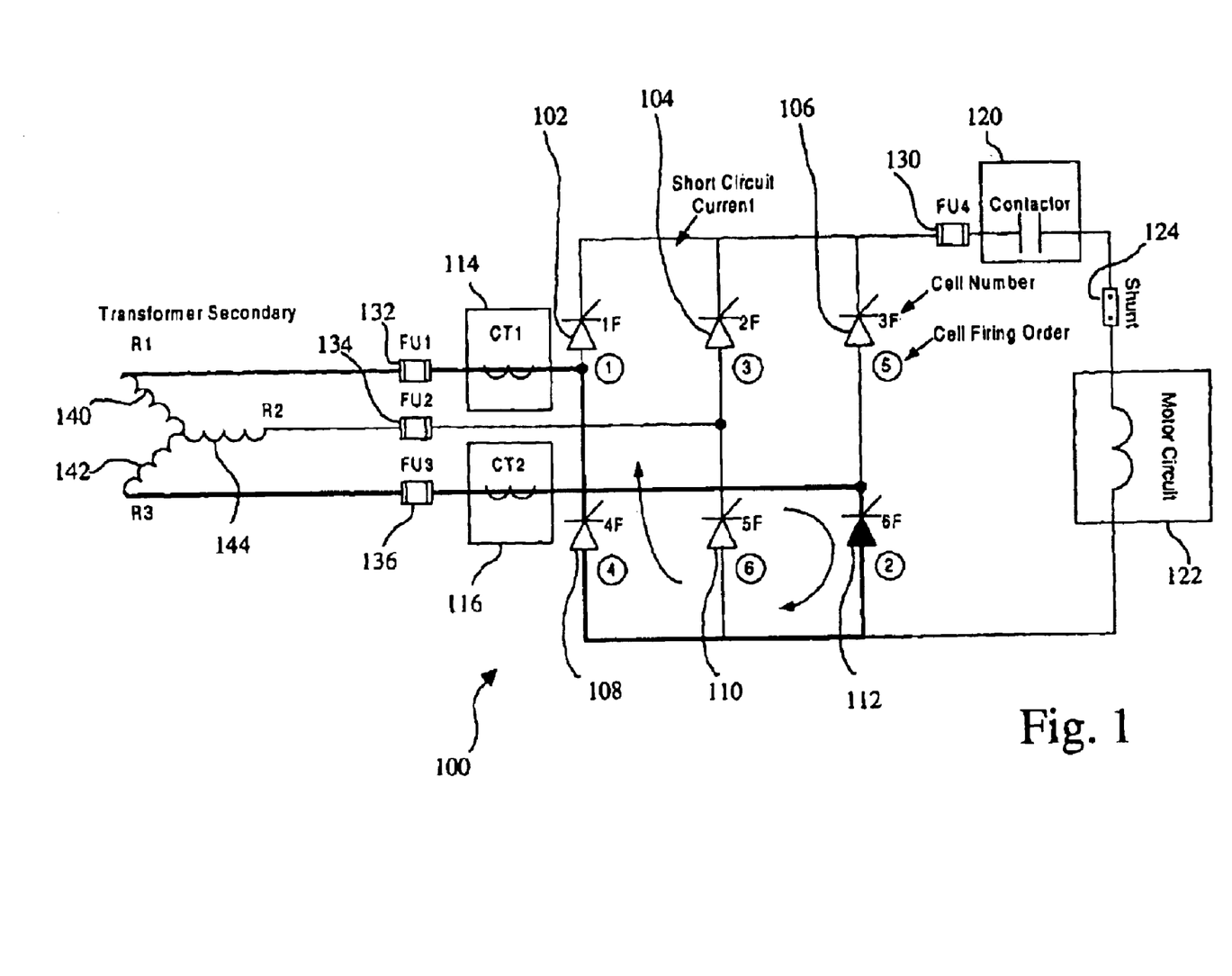
FIG. 1 is a circuit diagram showing a shorted SCR cell detected with current transformers in accordance with one embodiment of the invention.

In accordance with one embodiment of the invention, FIG. 1 is a circuit diagram showing a circuit 100. More specifically, FIG. 1 illustrates a shorted SCR cell 112 detected with current transformers in accordance with one embodiment of the invention. The circuit 100 includes a plurality of cells. These cells include a 1F cell 102, 2F cell 104, 3F cell 106, 4F cell 108, 5F cell 110, and the 6F cell 112. Further, FIG. 1 shows the cell firing order of each of the cells (102–112).

With further reference to FIG. 1, the circuit 100 also includes a current transformer CT1 114 and a current transformer CT2 116. Additionally, the circuit 100 includes a contactor 120, a motor circuit 122, and a shunt 124. A plurality of fuses are also utilized in the circuit 100 including fuses 130, 132, 134 and 136. Further, the circuit 100 includes the three phase transformer secondary windings (140, 142, 144).

In accordance with the method of one embodiment of the invention, one particular cell is gated in order to test the status of a corresponding cell. This relationship between corresponding cells is shown in Table 1, which is a look-up table to determine a shorted cell, based on which cell is gated. That is, the look-up table is used to correlate which cell is undergoing test based on which cell is gated.

TABLE 1

Look-up Table to Determine Shorted Cell

| Column 1<br>CT_Data_Ptr | Column 2<br>Cell<br>Gated | Column 3<br>Cell Under<br>Test<br>(CT Detect) | Column 4<br>Cell Under Test<br>(Motor Circuit) |
|---|---|---|---|
| 1 | 2F | 1F | 4F |
| 2 | 4F | 6F | 3F |
| 3 | 3F | 2F | 5F |
| 4 | 5F | 4F | 1F |
| 5 | 1F | 3F | 6F |
| 6 | 6F | 5F | 2F |

Table 1 shows the respective look-up values as set out in column 1. As shown in column 1, the Cell test data pointer (CT_Data_Ptr) value indicates each step of the cell gate firing sequence. With each step, this pointer is indexed by one. Further, column 2 shows the particular cell that may be gated. Columns 3 and 4 contain the cells that are tested, based on which detection method is used, and the correlation of those cells to the cell that is gated. Specifically, column 3 includes the look-up table values for "cell under test" if current transformers are used. Further, column 4 includes the look-up table values for "cell under test" if the test is performed by monitoring the current or voltage in the external motor circuit.

To further explain, and with reference to Table 1, if cell 2F is gated on and current transformer detection is utilized, then the cell being tested, as a result of the gating of cell 2F, is cell 1, i.e., based on columns 2 and 3 of Table 1. In a similar manner, if cell 4F in column 2 is gated on and the current transformer detection technique of the invention is utilized, then the cell under test is cell 6F in column 3.

Alternatively, these cells may also be tested by monitoring the current or voltage in the external motor circuit. In this situation, and with further reference to Table 1, if cell 2F is gated on then the cell under test is cell 4F, i.e., based on columns 2 and 4 in Table 1. In a similar manner, if current, or alternatively the voltage, in the external motor circuit is monitored, the gating of cell 1F in column 2 corresponds to the testing of cell 6F in column 4. It should be appreciated that the method of the invention provides various advantages. Such advantages include, for example, that current transformer detection is not limited by external motor parameters. Further, current transformer detection has a better signal to noise ratio. That is, with a shorted cell, the internal bridge current level, i.e., the shorted transformer secondary, is generally much greater than that flowing through the external motor circuit.

A further advantage is that current transformer detection of the invention provides redundancy when used with shunt detection. Further, the short circuit test is not sensitive to voltage noise when voltage detection is ignored for bridges having current transformers.

A further advantage is provided by utilizing the above-described redundancy. Specifically, when both current transformer detection and shunt detection are utilized, fewer cell firings are needed to diagnose a shorted cell. This results in reducing stresses on fuses, for example. As illustrated in FIG. 1, 6F cell 12 is shorted. Referring to Table 1 above, the gating of 4F cell 108 will place 6F cell 112 under test when using the current transformer detection of the invention. As a result, when 4F cell 108 is gated on, current due to the shorted cell will flow resulting in the identification of 6F cell 112 as being shorted. To further explain, when 4F cell 108 is gated on, and the transformer secondary voltage R3 is greater than R1, current will flow from R3, through fuse FU3 136 and then through current transformer CT2 116. The flow of current will then continue through the shorted cell 6F 112, cell 4F 108, current transformer CT1 114 and fuse FU1 132 back to R1. This flow of current is illustrated by the heavy line of FIG. 1.

In accordance with the illustrative embodiment of the invention shown in FIG. 1, for clarity, current is not shown passing through shunt 124. Any extraneous current flowing through the shunt is below the threshold level set. Accordingly, current passing through the shunt is not utilized in the detecting of the shorted 6F cell 112.

Figure 2:
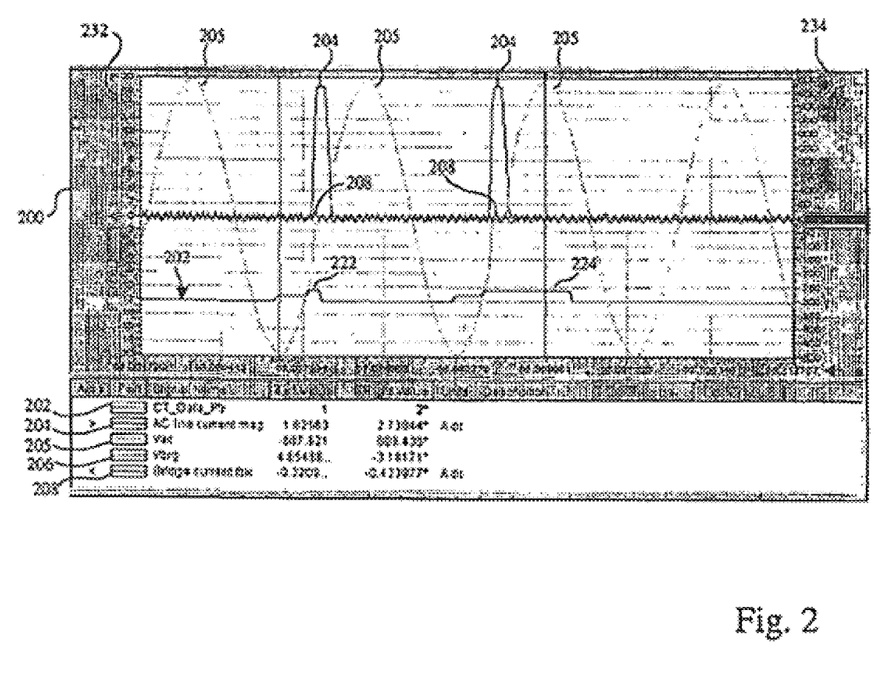
FIG. 2 is a display window using a control system trend recorder showing a capture buffer trace illustrating a short detected by current transformers in accordance with one embodiment of the invention.

FIG. 2 is a display window using a suitable control system trend recorder showing a capture buffer trace illustrating a short detected by current transformers in accordance with one embodiment of the invention. The signals shown in FIG. 2, as well as those signals shown in FIGS. 4 and 5 discussed below, are shown in Table 2. Also for purposes of explanation, Table 2 includes illustrative sensors that might be used to monitor the signals (202–208).

current feedback 208 in Amps DC. Further, the right hand scale 234 is AC line current magnitude 204 in Amps DC. Also, the horizontal scale in FIG. 2 shows the progression of time.

The current transformer signal, i.e., the AC line magnitude 204, is a rectified and scaled signal so that the direct current signal level is equivalent to the shunt current under non shorted conditions. The steps (222, 224) in the display 200 as shown in FIG. 2 indicate each step of the cell firing sequence. As described above in conjunction with Table 1, the identification of which cell is gated corresponds to the testing of a particular cell. Accordingly, step two (222, 224) of CT_Data_Ptr 202 as shown in FIG. 2 corresponds to 4F cell 108 being gated. It should be appreciated that the cell test as illustrated in FIG. 2 may be repeated to ensure that similar test results are obtained. Accordingly, FIG. 2 illustrates step 2 being repeated, i.e., step two (222, 224). As may be observed from FIG. 2, note the high current magnitude 204 and the distortion of the incoming Vac 205 at this point that corresponds to the step two (222, 224) locations.

In order to more fully understand the method of the present invention, hereinafter further aspects of detecting shorts in cells will be described. As noted above, it should be appreciated that the technique utilizing current transformers in accordance with embodiments of the invention may also be utilized in conjunction with other techniques for determining shorts. Specifically, hereinafter shunt and voltage feedback detection will be described.

Figure 3:
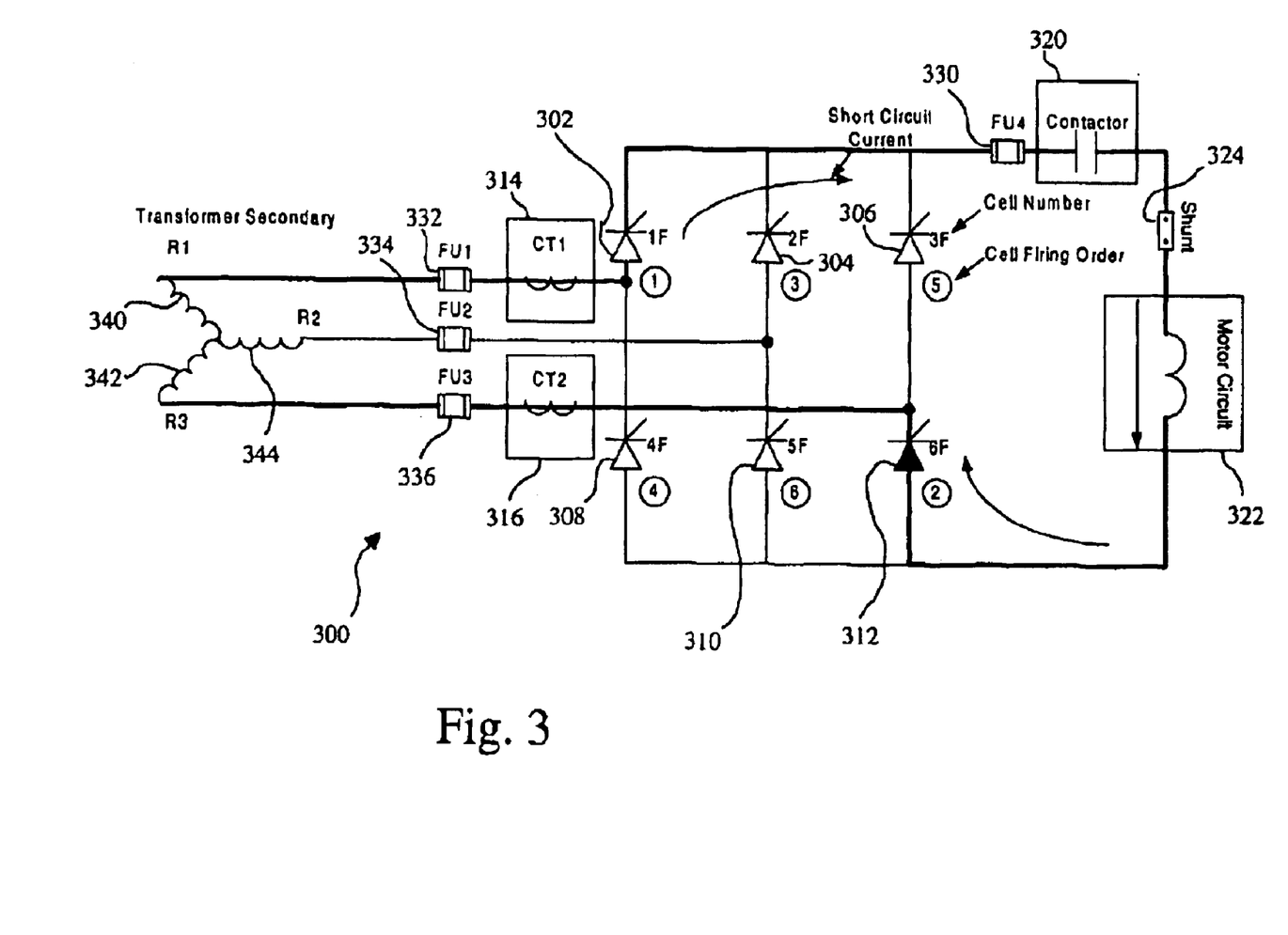
FIG. 3 is a circuit diagram showing a shorted SCR cell detected with shunt current in accordance with one aspect of the invention.

In accordance with one embodiment of the invention, FIG. 3 is a circuit diagram showing a circuit 300. The circuit diagram of FIG. 3 shows a shorted SCR cell 312 detected with shunt current. The circuit 300 includes a plurality of cells. The cells include a 1F cell 302, 2F cell 304, 3F cell 306, 4F cell 308, 5F cell 310, and the 6F cell 312. Further, FIG. 3 shows the cell firing order of each of the cells (302–312).

TABLE 2

| Number | Signal Name | Description | Sensor Used |
| --- | --- | --- | --- |
| 202 | CT_Data_Ptr | Cell test step sequence | Internal software |
| 204 | AC Line Current Mag | Rectified and scaled CT current | Current Transformer |
| 205 | Vac | Bridge incoming voltage phase A and C | Voltage attenuator & VCO |
| 206 | Vbrg | Bridge DC output voltage | Voltage attenuator & VCO |
| 208 | Bridge Current Fbk | Shunt DC current | Shunt |

The capture buffer trace of FIG. 2 was taken when running a cell test on a bridge with 6F cell 112 being physically shorted. Illustratively, the transformer and motor data in the circuit is shown in Table 3 below. Further, the short circuit test alpha firing angle is 103 degrees, in this illustrative example.

TABLE 3

| Transformer Data | Motor Data |
| --- | --- |
| 1000 KVA | 41.8 Amp |
| 5.69% | 500 Volt |
| 4160 Volt/480 Volt Y | |

As shown in FIG. 2, the current transformer detected a short with cell 6F 112. It should be appreciated that the bridge shunt current feedback 208 and bridge voltage feedback 206 signals have been disabled for the test as depicted in FIG. 2. As shown in FIG. 2, the left scale 232 is the bridge With further reference to FIG. 3, the circuit 300 also includes a current transformer CT1 314, and a current transformer CT2 316. Additionally, the circuit 300 includes a contactor 320, a motor circuit 322, and a shunt 324. A plurality of fuses are also utilized in the circuit 300 including fuses 330, 332, 334 and 336. Further, the circuit 300 includes the three phase transformer secondary windings (340, 342, 344).

The circuit diagram of FIG. 3 shows detection by shunt current with 6F cell 312 being shorted. With further reference to Table 1 above, the gating of 1F cell 302 corresponds to testing 6F cell 312. Accordingly, the 1F cell 302 may be gated on such that the transformer secondary voltage R1 is greater than R3. As a result of the transformer secondary voltage R1 being greater than R3, current will flow from R1 through fuse FU1 332, and current transformer CT1 314. Then the current will flow through 1F cell 302, fuse FU4 330 into the contactor 320. Thereafter, the current will pass through the shunt 324, the motor circuit 322, and through the shorted 6F cell 312. Thereafter, the current will pass through the current transformer CT2 316. Further, the current will flow through fuse FU3 336 and back to R3 342. This current flow is shown by the heavy line of FIG. 3.

Figure 4:
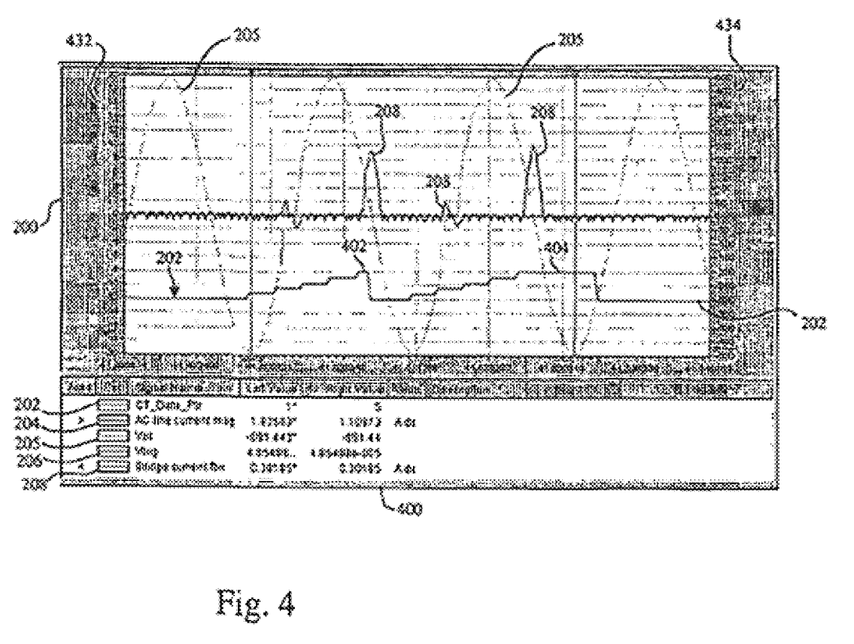
FIG. 4 is a display window using a control system trend recorder showing a capture buffer trace illustrating a short detected by shunt current in accordance with one aspect of the invention.

This current flow of FIG. 3, which is indicative of a shorted 6F cell 312, is illustrated in the capture buffer trace shown in FIG. 4 using a control system trend recorder. That is, FIG. 4 is a display 400 showing the short of 6F cell 312, as detected by shunt current. It should be appreciated that for the test as illustrated by FIG. 4, current transformer detection and voltage feedback detection have been disabled. As shown in FIG. 4, the left scale 432 is the bridge current feedback 208 in Amps DC. Further, the right hand scale 434 is AC line current magnitude 204 in Amps-DC, which is generally zero (0) during the test of FIG. 4.

Illustratively, the transformer and motor data for the test depicted in FIG. 4 may be as shown in Table 3 above. Further, the short circuit test alpha firing angle is 103 degrees, in this illustrative example.

Further, the steps (402, 404) in FIG. 4 indicate which cell pair is being gated. Accordingly, and with further reference to Table 1, the steps five (402, 404) of CT-Data_Ptr 202 correspond to the gating of 1F cell 302 in order to test cell 6F 312 using the shunt detection (motor circuit). As may be observed from FIG. 4, the AC incoming wave VAC 205 is distorted where the shorted cell current path is through the bridge at Step 2 of CT_Data_Ptr 202. A small amount of current is detected at this point through the shunt 208, i.e., below threshold level of the shunt, due to the drop across the cells. The shunt detection of the shorted cell does not occur at step 2 as shown in FIG. 4, but occurs later in step five 402 of CT_Data_Ptr 202 when current flows through the motor circuit. Note that the current flowing through the motor circuit current at step five is of lower magnitude than that which would have been observed at step 2 if the current transformer detection had been enabled to detect bridge short circuit current, i.e., see FIG. 2 AC line current mag 204.

Figure 5:
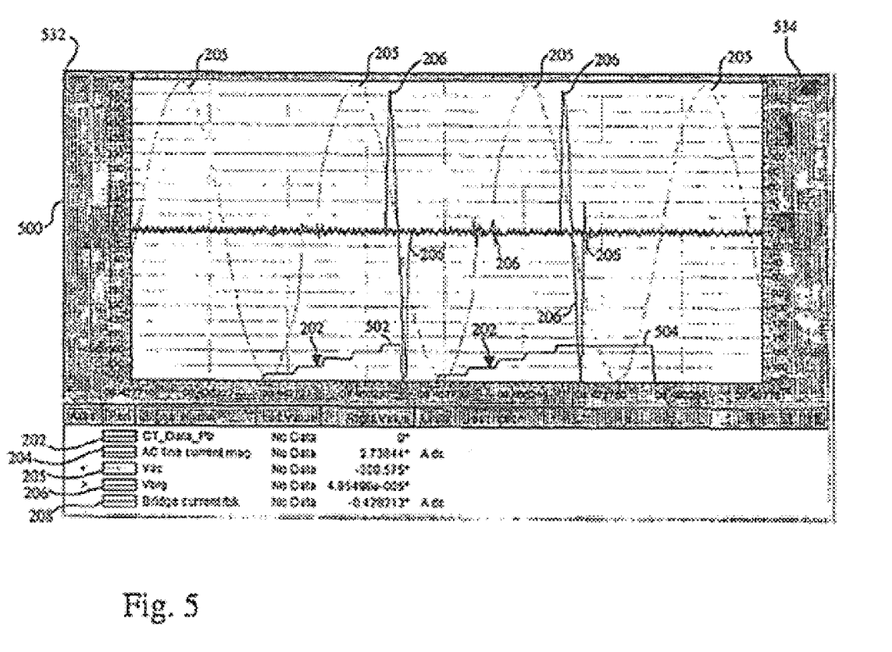
FIG. 5 is a display window using a control system trend recorder showing a capture buffer trace illustrating a short detected by voltage feedback in accordance with one aspect of the invention.

Aspects of the current flow of FIG. 3, which is indicative of a shorted 6F cell 312, are further illustrated in the capture buffer trace shown in FIG. 5 using a suitable control system trend recorder. That is, FIG. 5 is a display 500 showing the short of 6F cell 312, as detected by voltage feedback. It should be appreciated that for the test as illustrated by FIG. 5, current transformer detection and the shunt feedback detection have been disabled. As shown in FIG. 5, the left scale 532 is the Vac 205 in Volts-AC. Further, the right hand scale 534 is Vbrg 206 in Volts-DC.

Illustratively, the transformer and motor data for the test depicted in FIG. 5 may be as shown in Table 3 above. Further, the short circuit test alpha firing angle may also be 103 degrees, in this illustrative example.

Further, the steps (502, 504) in FIG. 5 indicate which cell is being gated. Accordingly, and with further reference to Table 1, step five (502, 504) corresponds to the gating of 1F cell 302, in order to test 6F cell 312. As may be observed from FIG. 5, the DC bridge output voltage Vbrg 206 is distorted where the shorted cell current path is through the bridge, step 2 of CT_Data_Ptr 202. Note that additional noise voltage spikes are generated in the DC bridge voltage Vbrg 206 during the test due to ringing of the cells, for example.

Hereinafter, determination of table values will be described. In a normal operating condition, cells are gated on in pairs. For the short circuit cell test, cells are fired on one at a time. The gated cell fires at the time the following paired cell in firing sequence order would normally be activated, i.e., the cell under test. For example in FIG. 3, 1F cell 302 would be gated on at the time the following cell under test (cell 312) is normally activated. Should current above the threshold level be observed in the shunt, the cell under test would be considered shorted. (See Table 1). The alpha firing angle of the gated cell is limited to no smaller than 65 degrees, for example, and is normally set to a larger firing angle to minimize the current flow should the cell under test be shorted.

Figure 6:
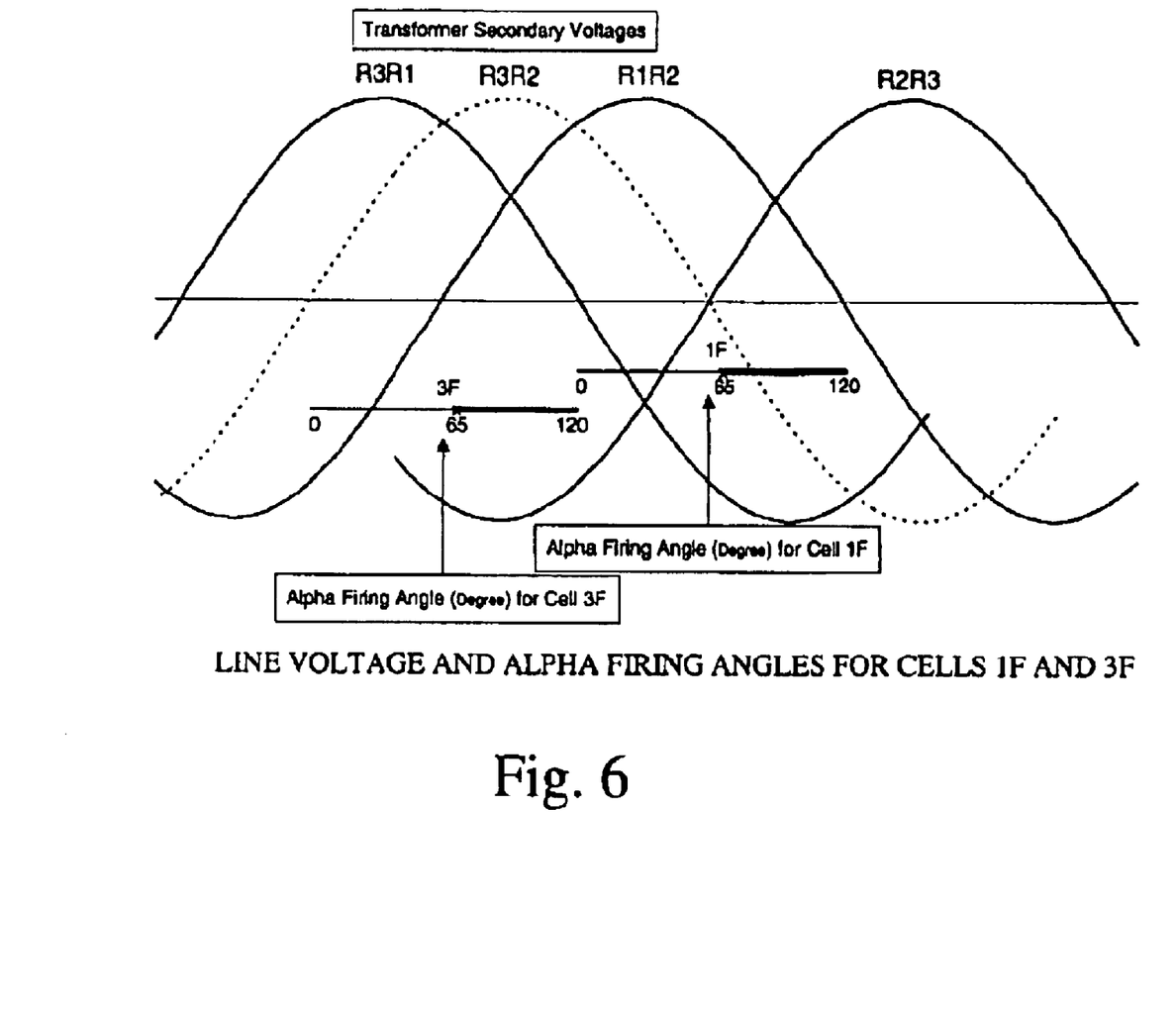
FIG. 6 is a diagram showing line voltage and alpha firing angles for cells 1F and 3F in accordance with one aspect of the invention.

Using the same gate firing arrangement as above, a shorted cell can also be determined using current transformers in the method of the invention. During cell test, if one of the two cells gated on is in the upper or lower bridge with the shorted cell, then large bridge currents can flow as the transformer secondary winding is shorted when the cell is gated on. This is shown in FIG. 1 and described above. The magnitude of the current depends on when the cell is gated on relative to the incoming voltage, the alpha firing angle of the gated cell and the impedance of the transformer and cables. Detection of current above the threshold level in the CTS and not in the shunt would indicate a shorted 6F cell 112. In FIG. 1, short circuit current in the bridge will flow when 4F cell 108 is gated on, not when 5F cell 110 is gated on. Further, 4F cell 108 is gated on at the time its paired 3F cell 106 (next in firing order) is gated on. As voltage R3-R1 142-140 is positive during this time (see FIG. 6 which is a diagram showing line voltage and alpha firing angles for cells 1F and 3F) short circuit current will flow. The 5F cell 110 is gated on at the time its paired 1F cell 102 (next in firing order) is gated on (see FIG. 6). Voltage R3-R2 142–144 must be positive at this time for current to flow through 5F cell 110. It is negative so short circuit current does not flow. The other values in the table for current in the bridge (CT detect) and motor circuit (shunt detect) were determined accordingly.

As described herein, the method of the invention provides for determining a shorted thyristor, such as a silicon controlled rectifier (SCR) cell, in a bridge that supplies a load. The bridge contains a plurality of cells. The method includes the steps of sequentially gating one cell at a time to a conducting state, and generating a current that flows through the bridge including the one cell that is gated and the shorted cell. It should be appreciated that the source as described above may be a single phase source or a three phase source, for example. The source may be a suitable transformer arrangement. If using a single phase source, the method of the invention may use one current transformer by which to detect the shorted cell. However, if a three phase source is utilized, for example, the method of the invention uses two transformers for the three phase source to identify the shorted cell.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure, which includes the attachments, is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A method for determining a shorted thyristor cell in a bridge that supplies a load from a source, the bridge including a plurality of the thyristor cells, the method including:

sequentially gating each of the cells to a conducting start, so that only one cell is gated at one time;

providing at least one current transformer in the bridge, generating a current flow that passes through the budge including the one cell that is gated;

observing current in the at least one current transformer to determine a short in one of the cells that is not gated; and determining a shorted cell based on the step of observing current in the at least one current transformer.

2. The method of claim 1, wherein the at least one current transformer is placed on incoming lines to the bridge.

3. The method of claim 1, wherein the bridge supplies the load to a motor.

4. The method of claim 1, wherein the bridge further includes a shunt, the shunt having a shunt current signal value.

5. The method of claim 4, wherein the current flow that is generated is below the shunt current signal value.

6. The method of claim 4, further including the step of rectifying and scaling a current flow of the at least one current transformer that passes through the bridge, so that a signal level of the current flow that passes trough the bridge is substantially the same as that of the shunt current signal value under non-shorted cell conditions.

7. The method of claim 1, wherein the method further includes the step of:

providing a shunt in the bridge; and the step of determining a shorted cell is performed bawd on the observing current in the at least one current transformer and by observing current in the shunt to be above a threshold level.

8. The method of claim 1, wherein the step of determining a shorted cell is performed based on the observing current in the at least one current transformer and observing the bridge voltage to be above a threshold level.

9. The method of claim 8, wherein the bridge supplies the load to a motor.

10. The method of claim 1, where in the step of observing current in the at least one current transformer to determine a short in one of the cells that is not gated includes using a look-up table to correlate which cell is tested based an which cell is gated.

11. The method of claim 1, wherein the thyristor cell is a silicon controlled rectifier (SCR) cell.

12. The method of claim 1, wherein the source is a single phase source.

13. The method of claim 12, wherein the at least one current transformer is one current transformer.

14. The method of claim 1, wherein the source is a three phase source, and wherein the at least one current transformer is two current transformers.

15. A method for determining a shorted thyristor cell in a bridge that supplies a load from a source, the bridge including a plurality of the thyristor cells, the method including:

sequentially gating each of the cells to a conducting state, so that only one cell is gated at one time;

providing at least one current transformer in the bridge, the at least one current transformer being placed an incoming lines to the bridge, the bridge supplying the load to a motor;

generating a current flow that passes through the bridge including the one cell that is gated, and wherein the bridge further includes a shunt, the shunt having a shunt current signal value, and wherein the current flow that is generated is below the shunt current signal value;

observing current in the at least one current transformer to determine a short in one of the cells the that is not gated; and determining a shorted cell based on the step of observing current in the at least one current transformer.

16. The method of claim 15, wherein the thyristor cell is a silicon controlled rectifier (SCR) cell.

17. The method of claim 15, wherein the source is a single phase source.

18. The method of claim 17, wherein the at least one current transformer is one current transformer.

19. The method of claim 15, further including the step of rectifying and scaling a current flow of the at least one current transformer that passes through the bridge, so that a signal level of the current flow that passes through the bridge is substantially the same as that of the shunt current signal value under non-shorted cell conditions.

20. The method of claim 15, wherein the step of determining a shorted cell is performed based on the observing current in the at least one current transformer and by observing the bridge voltage to be above a threshold level.

21. The method of claim 4, wherein:

if current within the shunt is above a threshold level, current transformer current detection is ignored and a look-up table for the shunt is used; and if a current transformer current threshold level is reached and the shunt current is below the threshold level, a look-up table for the current transformer is used.

22. The method of claim 4, wherein current transformer detection of a shorted thyristor cell is used in conjunction with shunt detection of a shorted thyristor cell.

* * * * *

UNITED STATES PATENT AND TRADEMARK OFFICE
CERTIFICATE OF CORRECTION

PATENT NO.         : 6,791,852 B2
APPLICATION NO. : 09/683437
DATED                 : September 14, 2004
INVENTOR(S)       : Richard W. Carter et al.

It is certified that error appears in the above-identified patent and that said Letters Patent is hereby corrected as shown below:

Col. 9, line 9:   replace "start" with --state--;

Col. 9, line 12:  replace "budge" with --bridge--;

Col. 9, line 32:  replace "trough" with --through--;

Col. 9, line 38:  replace "bawd" with --based--;

Col. 9, line 51:  replace "an" with --on--;

Col. 10, line 14: replace "an" with --on--.

Signed and Sealed this

Tenth Day of October, 2006

JON W. DUDAS
*Director of the United States Patent and Trademark Office*